Figure 1:
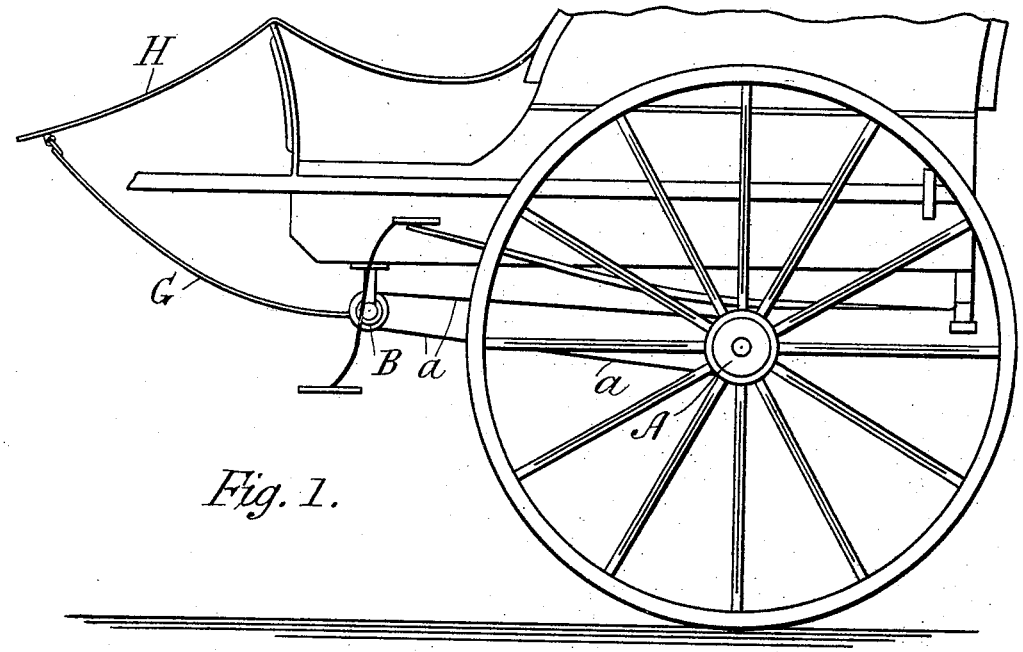

No. 611,702. Patented Oct. 4, 1898.
J. McKENZIE.
DEVICE FOR CHECKING RUNAWAY HORSES.
(Application filed Oct. 18, 1897.)
(No Model.) 2 Sheets—Sheet 1.

Witnesses
William James Bulgin
Albert Edward Ellen

Inventor
John McKenzie
By his Attorney
George Henry Rayner

THE NORRIS PETERS CO., PHOTO-LITHO., WASHINGTON, D. C.

No. 611,702. Patented Oct. 4, 1898.
J. McKENZIE.
DEVICE FOR CHECKING RUNAWAY HORSES.
(Application filed Oct. 18, 1897.)
(No Model.) 2 Sheets—Sheet 2.
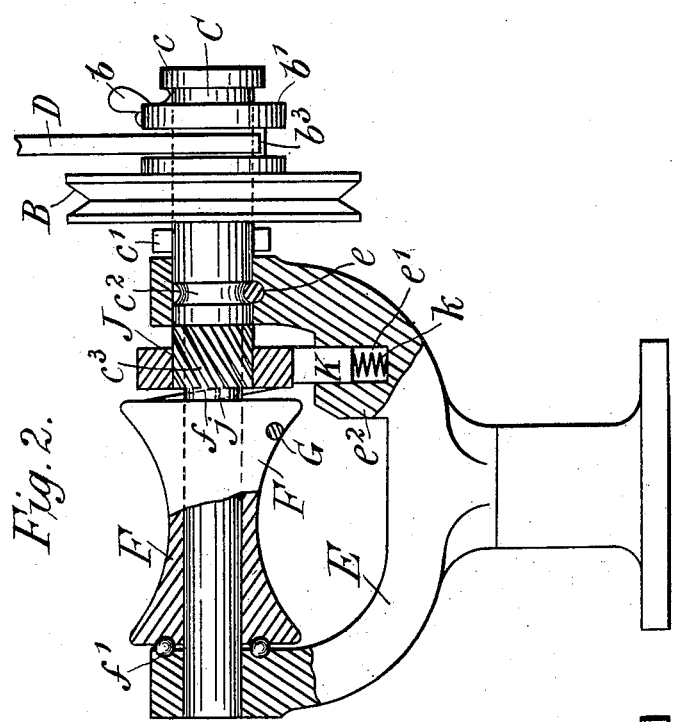
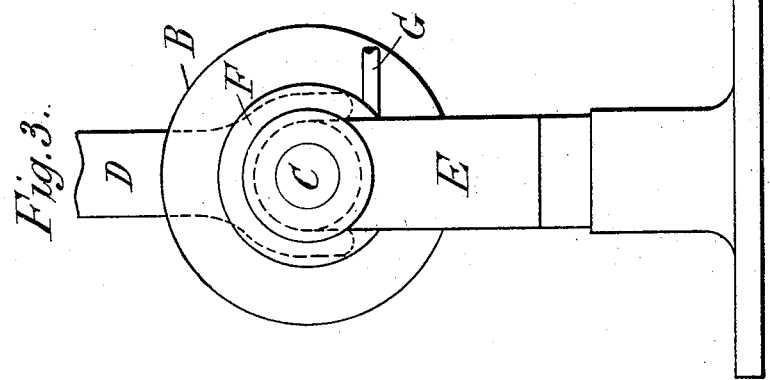
Witnesses
William James Bulgin
Albert Edward Eller
Inventor
John McKenzie
By his Attorney
George Henry Rayner
THE NORRIS PETERS CO., PHOTO-LITHO., WASHINGTON, D. C.

UNITED STATES PATENT OFFICE.

JOHN McKENZIE, OF COWES, ENGLAND.

DEVICE FOR CHECKING RUNAWAY HORSES.

SPECIFICATION forming part of Letters Patent No. 611,702, dated October 4, 1898.

Application filed October 18, 1897. Serial No. 655,580. (No model.)

*To all whom it may concern:*

Be it known that I, JOHN MCKENZIE, engineer, a subject of the Queen of Great Britain and Ireland, residing at Abbotsford, Thetis road, Cowes, Isle of Wight, England, have invented an Improved Device for Checking Runaway Horses, of which the following is a specification.

This invention relates to a device to be employed for stopping runaway horses; and its object is to provide an arrangement which can be easily applied and which will bring the horse to a standstill.

In carrying out my invention I propose to fit to the inside of the wheel-hub a grooved pulley or wheel, over which a chain or rope passes. This connection also passes over a second grooved pulley carried by a spindle, to which it is fitted by means of a feather. This wheel is free to move to one side, so as to engage with or disengage from the spindle, and a forked lever is employed to bring it into or out of position, this lever being worked by the hand or foot of the driver. On the spindle a worm or screw-thread is formed, and on this a sleeve or clutch is placed, screw-threaded internally, so as to fit the worm. One end of this clutch is formed with a tooth, adapted to engage with the end of a pulley or reel formed in a corresponding manner and carried loosely on the spindle. The spindle is provided with a stop, preventing the pulley-wheel being drawn too far back. The clutch is formed with ratchet-shaped teeth, and a pin is fitted in a small cylindrical hole or socket, within which a spring is placed. This spring causes the pin to project against the teeth, for the purpose hereinafter described. On the loose pulley first described being caused to engage with the spindle by the lever the spindle will be turned and will screw the clutch forward until it engages with the pulley. The latter is then turned with the clutch, winding up a strap or connection passing to the reins, until the vehicle is stopped. On the horse backing the arrangement will at once be disconnected, the spring-pin above described preventing the clutch from turning and so allowing it to be screwed back, releasing the clutch-pulley and letting the horse have his head.

In order that the invention may be more clearly understood, reference is had to the accompanying sheet of drawings, in which—

Figure 4:
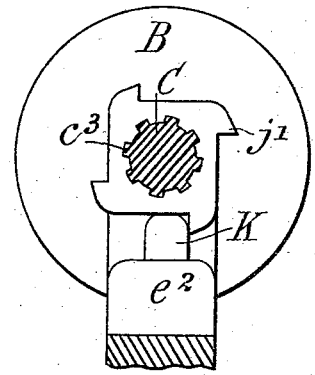
Figure 5:
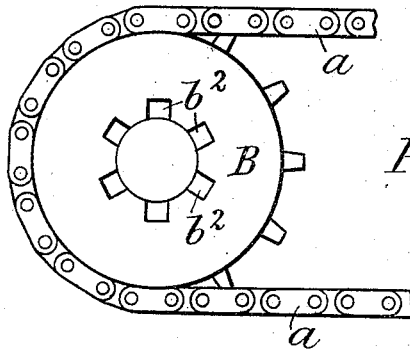

Figure 1 is a view showing the device applied to a vehicle. Fig. 2 is a sectional elevation of the device. Fig. 3 is an elevation at right angles to Fig. 2, and Figs. 4 and 5 are details.

A is the boss on which the grooved or toothed wheel is formed or fitted and which operates the device. The cord, chain, or other connection $a$ passes over the wheel and engages with the second grooved wheel B, mounted loosely on the spindle C. At each extremity of the spindle C the shoulder or collar $c$ is formed, against which the spring $b$, attached to the boss $b'$, bears. This spring is fixed so as to press the grooved wheel B toward a pin $c'$, fixed to the spindle, and cause the pin $c'$ to enter into one or other pair of the recesses $b^2$ formed in the base of the grooved wheel B, (see Fig. 5,) thereby causing the spindle to revolve when the vehicle is in motion. The channel $b^3$ formed in the boss $b'$ serves to receive the end of a bifurcated rod D, by means of which the wheel B can be held out of gear with the spindle by means of the pin $c'$. The rod D also acts to cause the engagement of the wheel B and the pin $c'$. The rod D is actuated by cranks and levers in any well-known manner and can be operated either by hand or foot, as desired. The spindle is mounted in the forked bearing-bracket E and is kept in position by the pin $e$, which passes through one arm of the bearing-bracket and into a groove $c^2$ on the spindle. Between the arms of the bearing-bracket and loosely mounted on the spindle is a pulley or reel F, on which winds a cord, strap, or other connection G, connected to the reins H, and which will, when wound on the said reel, cause the reins to tighten and so stop the horse. To throw this wheel into gear with the spindle, the projection or nose $f$ is provided, engaging with a similar projection $j$ on a clutch J, which is fitted on a worm or screw-threaded portion $c^3$ of the spindle and which will, when the spindle is revolved, cause the clutch to engage with and revolve the reel.

In order to prevent the clutch revolving with the spindle before properly engaged with the reel, the pin K is provided, fitting into a recess $e'$ formed in a projection $e^2$ on one arm of the bearing-bracket, which is caused to press against the clutch by the spring $k$, placed at the bottom of the recess.

The clutch is formed with the ratchet-shaped teeth $j'$, which depress the pin when the spindle is revolved, thereby preventing the latter being revolved in the wrong direction.

On the horse backing the clutch is immediately thrown out of gear with the reel and the connection and reins are released, but on the horse advancing again the reins are tightened and the horse stopped.

The reel may be provided with a ball-bearing $f'$ to reduce the friction against the bracket.

What I claim as my invention, and desire to secure by Letters Patent, is—

1. An improved device for checking runaway horses consisting of a pulley or other wheel on the axis of the vehicle-wheel, a spindle, a loose pulley or other wheel on said spindle, pins and recesses enabling the loose pulley or wheel to engage with the spindle, means for causing said pulley or wheel to engage with the spindle or not, connections between the pulleys, a worm or screw on the spindle, a loose reel, a clutch on said worm or screw adapted to be moved longitudinally thereby said clutch in one position engaging with the loose reel, and connections to the reins substantially as described and for the purposes specified.

2. In an improved device for checking runaway horses the combination with a pulley or other wheel on the axis of the vehicle-wheel, a spindle, a loose pulley or other wheel on said spindle, pins and recesses enabling the loose pulley or wheel to engage with the spindle, means for causing said pulley or wheel to engage with the spindle or not, connections between the two pulleys, a worm or screw on the spindle, a loose reel, a clutch on said worm or screw adapted to be moved longitudinally thereby said clutch in one position engaging with the loose reel, and connections to the reins, of a spring-pin engaging with ratchet-shaped teeth on the said clutch to prevent rotation in the wrong direction substantially as described and for the purposes specified.

3. In an improved device for checking runaway horses the combination with a wheel on the boss A, the spindle C, the wheel B carried loosely on the spindle, connections between said wheel B and the wheel on the boss A, the recesses $b^2$ formed in the wheel, spring $b$, the pins $c'$ on the spindle C engaging with the loose wheel and the clutch J, reel F engaging with the clutch both mounted on a spindle a guide-pin $e$ and connections from the reel to the reins substantially as described and shown in the accompanying drawings and for the purposes specified.

In witness whereof I have sworn to set my hand in the presence of two witnesses.

JOHN McKENZIE.

In presence of—
THOMAS HART,
EMANUEL HUSKIE.